(12) United States Patent
Hoffman et al.

(10) Patent No.: US 7,750,598 B2
(45) Date of Patent: Jul. 6, 2010

(54) BATTERY CHARGER USER INTERFACE

(75) Inventors: Peter F. Hoffman, Avon, OH (US);
Rachel P. Devereaux, Ballwin, MO
(US); Michael J. Brandon, II, North
Ridgeville, OH (US); **Richard H.
Chapman, Camillus, NY (US); Mark A.
Ferguson**, Memphis, NY (US)

(73) Assignee: Eveready Battery Company, Inc., St. Louis, MO (US)

( * ) Notice: Subject to any disclaimer, the term of this patent is extended or adjusted under 35 U.S.C. 154(b) by 677 days.

(21) Appl. No.: 11/555,052

(22) Filed: Oct. 31, 2006

(65) Prior Publication Data
US 2008/0084183 A1  Apr. 10, 2008

Related U.S. Application Data

(63) Continuation-in-part of application No. 11/543,555, filed on Oct. 5, 2006.

(51) Int. Cl.
*H02J 7/00* (2006.01)
*G01R 13/02* (2006.01)
*G01R 31/36* (2006.01)

(52) U.S. Cl. .................... 320/107; 320/106; 702/63; 702/68

(58) Field of Classification Search ................ 320/106, 320/107, 110, 111, 112, 113, 114, 115, 116; 429/99; D13/103, 107; 702/63, 68
See application file for complete search history.

(56) References Cited

U.S. PATENT DOCUMENTS

| | | | | |
|---|---|---|---|---|
| 3,579,075 A | * | 5/1971 | Floyd | ............. 320/110 |
| 4,227,140 A | * | 10/1980 | Nardella et al. | ............. 320/113 |
| 4,237,409 A | * | 12/1980 | Sugalski | ............. 320/107 |
| 4,546,302 A | | 10/1985 | Smith | |
| 4,629,962 A | | 12/1986 | Arakawa | |
| 4,766,361 A | | 8/1988 | Pusateri | |
| 4,820,965 A | | 4/1989 | Siemer | |
| 4,876,496 A | | 10/1989 | Duncan | |
| 5,057,761 A | | 10/1991 | Felegyhazi | |
| 5,072,167 A | | 12/1991 | Zias | |

(Continued)

FOREIGN PATENT DOCUMENTS

DE  3827045 A1  2/1990

(Continued)

OTHER PUBLICATIONS

"Charge Manager 2020", Dec. 2003, Voltcraft Plus 2005/2006 Catalog, www.conrad.de, Part No. 51 20 80-99. p. 23, Germany.

(Continued)

*Primary Examiner*—Edward Tso
*Assistant Examiner*—M'Baye Diao
(74) *Attorney, Agent, or Firm*—Gregory J. Adams

(57) ABSTRACT

A battery charger (100) includes a plurality of battery receiving bays (108) for receiving batteries to be charged. A user interface (120) includes a display which displays information indicative of batteries received in the various bays (108) in graphical and textual form. The displayed information includes the number of batteries received in the charger, as well as their size, good/bad state, and state of charge.

14 Claims, 17 Drawing Sheets

U.S. PATENT DOCUMENTS

| | | | |
|---|---|---|---|
| 5,103,155 A | | 4/1992 | Joannou |
| 5,184,059 A | | 2/1993 | Patino |
| 5,371,455 A | | 12/1994 | Chen |
| 5,459,671 A | * | 10/1995 | Duley .......................... 702/63 |
| 5,486,750 A | | 1/1996 | Walborn |
| 5,686,808 A | | 11/1997 | Lutz |
| 5,686,811 A | | 11/1997 | Bushong |
| 5,691,742 A | * | 11/1997 | O'Connor et al. ........... 715/835 |
| 5,809,449 A | * | 9/1998 | Harper ........................ 702/63 |
| 5,895,440 A | * | 4/1999 | Proctor et al. ................. 702/63 |
| 5,965,998 A | | 10/1999 | Whiting |
| 5,966,821 A | | 10/1999 | Armbruster |
| 6,130,519 A | | 10/2000 | Whiting |
| D437,859 S | | 2/2001 | Alvarez |
| 6,320,358 B2 | | 11/2001 | Miller |
| 6,759,833 B1 | | 7/2004 | Chen |
| 6,844,705 B2 | | 1/2005 | Lai |
| 6,950,030 B2 | | 9/2005 | Kovarik |
| 2002/0063550 A1 | | 5/2002 | Chen |
| 2002/0117995 A1 | | 8/2002 | Oh |
| 2003/0062251 A1 | | 4/2003 | Pfeiffer |
| 2004/0070511 A1 | * | 4/2004 | Kim ......................... 340/636.1 |
| 2004/0080298 A1 | * | 4/2004 | Maggert et al. ............. 320/107 |
| 2005/0110467 A1 | | 5/2005 | Thomason |
| 2005/0125172 A1 | * | 6/2005 | Patino et al. .................. 702/63 |
| 2006/0055368 A1 | | 3/2006 | Chang |
| 2006/0071641 A1 | | 4/2006 | Ward |

FOREIGN PATENT DOCUMENTS

| | | |
|---|---|---|
| DE | 20308192 U1 | 9/2003 |
| EP | 1351364 B1 | 11/2005 |
| GB | 2240239 A | 7/1991 |

OTHER PUBLICATIONS

Patent Cooperation Treat (PCT), International Search Report and Written Opinion for Application No. PCT/US2007/021268, Filed Oct. 3, 2007, Mailed Mar. 28, 2008, European Patent Office, Netherlands.

Patent Cooperation Treaty (PCT), International Search Report and Written Opinion for Application No. PCT/US2007/021269, Filed Oct. 3, 2007, Mailed Mar. 31, 2008, European Patent Office, Netherlands.

"Automatic, fast chargers protect battery life", L'Electricite Automobile, vol. 26, No. 393-394, Jul.-Aug. 1972.

"Automatic battery charger", Herre H., Elektor, vol. 5, No. 7-8, Jul.-Aug. 1979, pp. 72.

"A buffer type charger for NICd batteries", Martin P., Revista Espanola de Electronica, vol. 31, No. 395, Oct. 1984, pp. 76-77.

"Circuit Provides Reverse-Battery Protection", Maxim Integrated Products, Maxim/Dallas, App Notes, Battery Management, Application Note 480, Dec. 21, 2000, pp. 12.

"Fast, Low-Voltage, Dual 4Ω SPDT CMOS Analog Switches", Maxim Integrated Products, MAS4635/MAZ4636, 19-1709, Rev 2, May 2003, pp. 1-11.

* cited by examiner

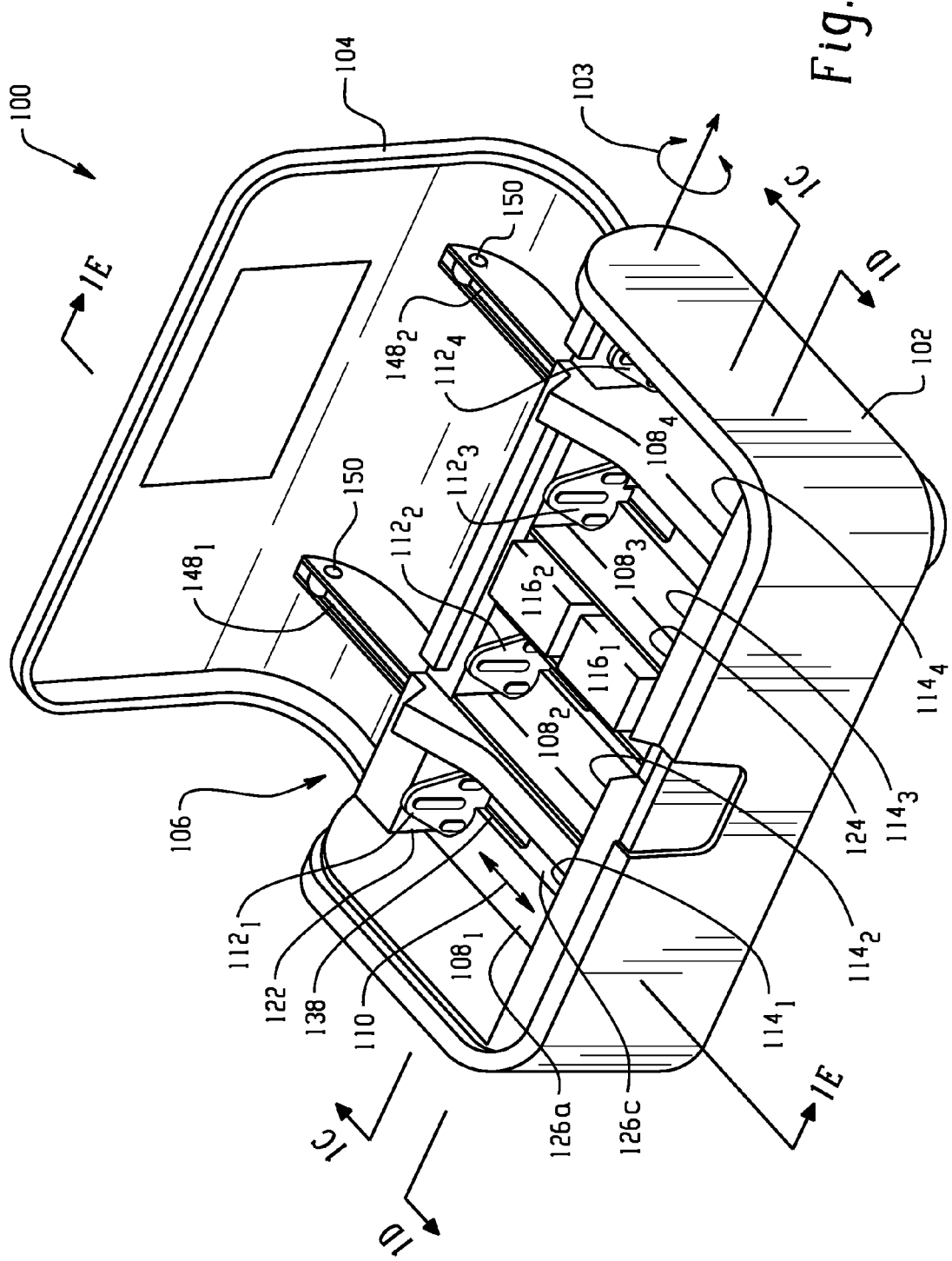

| DRAWING FIGURE | BATTERY POSITION | | | SWITCH POSITION | | | | | CHARGING RATE | LCD PANEL 1204 | CHARGING NOTE | LCD ICON 1202 | |
|---|---|---|---|---|---|---|---|---|---|---|---|---|---|
| | LEFT | CENTER | RIGHT | SWITCH K2 LEFT 1502 | SWITCH K1 1504 | SWITCH K2 RIGHT 1506 | AA SENSE 1508 | C/D SENSE 1510 | | | | | |
| 15A | AAA | AAA | | OPEN | OPEN | OPEN | OPEN | OPEN | NONE | | NONE | | X |
| 15B | AAA | AAA | | OPEN | OPEN | OPEN | CLOSED | OPEN | LO | AAA | CENTER ONLY | X | |
| 15C | | AAA | AAA | OPEN | OPEN | OPEN | CLOSED | OPEN | LO | AAA | CENTER ONLY | X | |
| 15D | | AAA | AAA | OPEN | OPEN | OPEN | CLOSED | OPEN | LO | AAA | CENTER ONLY | X | |
| 15E | AAA | AAA | AAA | OPEN | OPEN | OPEN | OPEN | OPEN | NONE | | NONE | | X |
| 15F | AAA | AAA | AAA | OPEN | OPEN | OPEN | CLOSED | OPEN | LO | AAA | SERIES | X | |
| 15G | AAA | AAA | AAA | OPEN | OPEN | OPEN | CLOSED | OPEN | LO | AAA | CENTER ONLY | X | |
| 15H | AA | | | CLOSED | OPEN | OPEN | OPEN | OPEN | NONE | | NONE | | X |
| 15I | | AA | | OPEN | OPEN | CLOSED | OPEN | OPEN | HI | AA | CENTER ONLY | X | |
| 15J | | | AA | OPEN | OPEN | CLOSED | OPEN | OPEN | NONE | | NONE | | X |
| 15K | AA | | AA | CLOSED | OPEN | CLOSED | OPEN | OPEN | HI | AA | SERIES | X | |
| 15L | AA | AA | AA | OPEN | CLOSED | OPEN | OPEN | OPEN | HI | AA | CENTER ONLY | X | |
| 15M | C | C | | OPEN | OPEN | OPEN | OPEN | CLOSED | HI | C | CENTER ONLY | X | |
| 15N | D | D | | OPEN | CLOSED | OPEN | OPEN | CLOSED | HI | D | CENTER ONLY | X | |

Fig. 14

BATTERY CHARGER USER INTERFACE

BACKGROUND

This application is a continuation-in-part of U.S. application Ser. No. 11/543,555, filed Oct. 5, 2006 and entitled Battery Charger.

The present application relates to electrical appliances which use batteries. While it finds particular application to battery chargers, it is also applicable to battery powered electrical devices.

Recent years have seen a proliferation of battery powered electrical devices. Digital cameras, personal digital assistants (PDAs), hand held games, portable audio players, remote control devices, wireless computer keyboards and mice, and mobile telephones are but a few examples of this trend.

Rechargeable (secondary) batteries, such as nickel-metal hydride (NiMH), nickel-cadmium (NiCd), and lithium ion (LiIon) electrical cells, have likewise gained increasing acceptance as a renewable power source for these and other devices. Rechargeable batteries are typically well-suited for use in relatively high-drain devices, making them attractive in a wide variety of applications. As they can be recharged and reused, rechargeable batteries can also provide convenience and cost advantages relative to non-rechargeable (primary) batteries.

One factor which can affect the acceptance of rechargeable batteries is the convenience and ease of use of the charger needed to charge them. To provide a reliable electrical connection to the batteries being charged, the charger's battery contacts exert a compressive force on the battery terminals. When inserting a battery for charging, however, it is necessary to overcome this contact force. The contact force must likewise be overcome when removing the battery from the charger. Unfortunately, the contact force can make it difficult to insert and/or remove the batteries, especially where there is limited access to the batteries, if the batteries are otherwise difficult to grasp, or where the user has limited strength or dexterity.

Still another factor which can affect the convenience of the charger is the need to insert the batteries in the proper polarity. This is especially true where the charger provides few visual or physical cues as to the proper battery orientation, under low light conditions, or where the user has limited technical expertise or is otherwise uncomfortable with the charging process.

Other considerations include the flexibility and size of the charger. For example, many users have a number of battery powered appliances, each requiring different size batteries. Consequently, a charger which is able to charge batteries of different sizes has the potential to provide significant cost and convenience advantages. Again, the convenience of the charger is enhanced where the charger is readily configured to accept the different size batteries. At the same time, it is generally desirable that charger be relatively compact, even for chargers which are intended primarily for use in a fixed location.

SUMMARY

Aspects of the present application address these matters, and others.

According to a first aspect of the present application, a battery charger includes a first battery charging bay which receives a variable number of batteries for charging, a second battery charging bay which receives a variable number of batteries for charging, and a human readable display. The display displays a first number of icons and a second number of icons, wherein the first number of icons represents the number of batteries received in the first bay and the second number of icons represents the number of batteries received in the second bay.

According to another aspect, a method includes determining a number of batteries received in a first battery receiving region of a battery charger, determining a size of a battery received in the first battery receiving region, determining a number of batteries received in a second battery receiving region of the battery charger, displaying the determined number batteries received in the first battery receiving region on a human readable display of the battery charger, displaying the determined size on the display, and displaying the determined number of batteries received in the second battery receiving region on the display.

According to another aspect, a battery charger includes a housing, a battery receiving region which receives a plurality of differently sized, generally cylindrical batteries for charging, a cover which allows a user to selectively access the battery receiving region, a battery size determiner which determines the size of a battery received in the battery receiving region, and a display which provides a human readable output indicative of the number and size of batteries received in the battery receiving region.

According to another aspect, a battery charger includes a first battery receiving region which receives at least one generally cylindrical battery for charging, a second battery receiving region which receives at least a one generally cylindrical battery for charging, and a human readable display. The display includes a first display region which displays information indicative of a battery received in the first battery receiving region. The first display region includes a first graphical display portion and a first textual display portion. The display also includes a second display region which displays information indicative of a battery received in the second battery receiving region. The second display region includes a second graphical display portion and a second textual display portion.

Those skilled in the art will recognize still other aspects of the present application upon reading and understanding the attached description.

BRIEF DESCRIPTION OF THE DRAWINGS

The present application is illustrated by way of example and not limitation in the figures of the accompanying drawings, in which like references indicate similar elements and in which:

FIGS. 1A and 1B are perspective views of a battery charger.

FIG. 14 depicts operation of a battery charger.

DETAILED DESCRIPTION

Figure 1A:
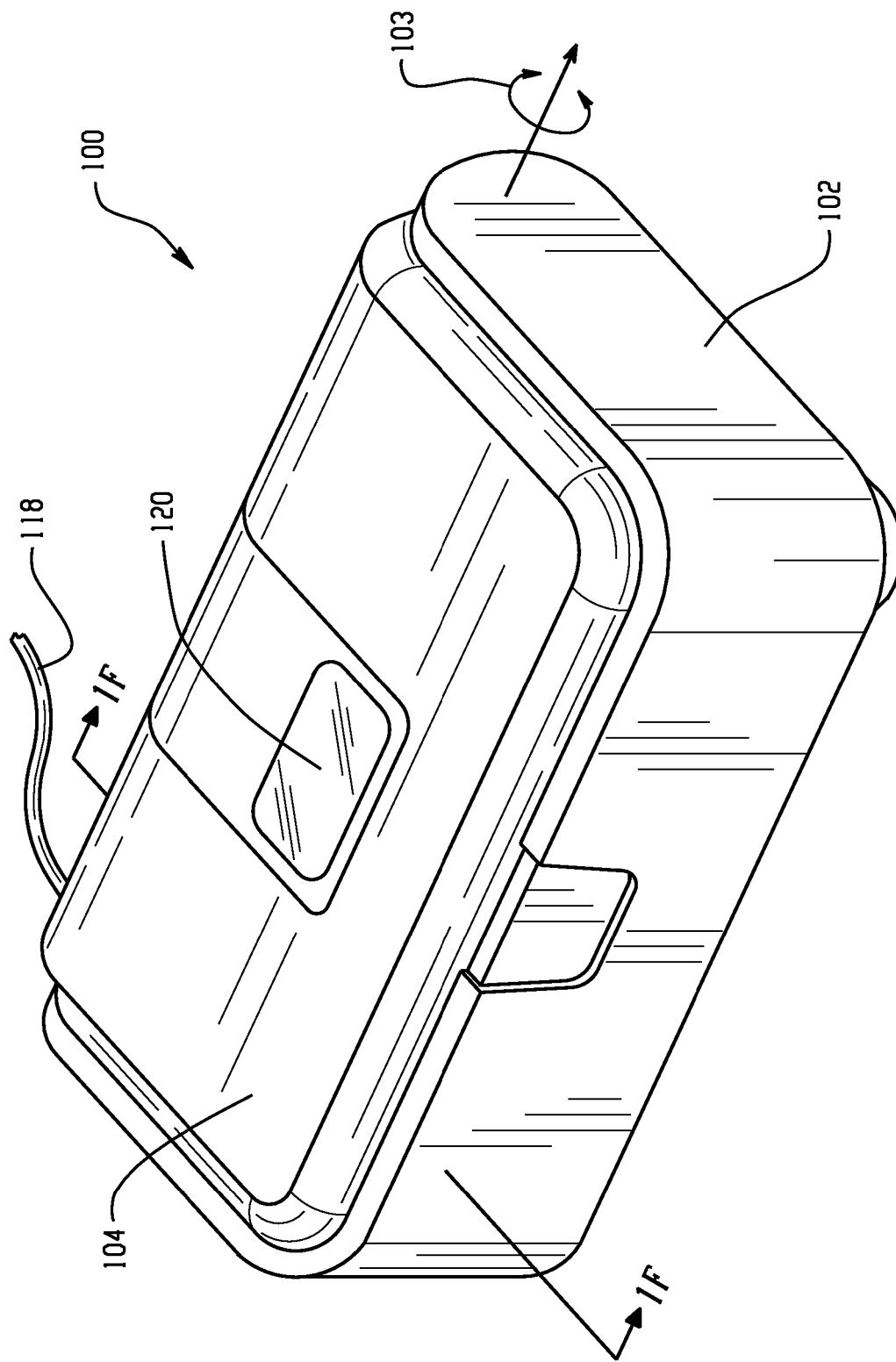

With reference to FIGS. 1A and 1B, a battery charger 100 includes a body 102 and a cover 104 which is mounted for pivotal motion relative to the body 102 about a pivot or hinge axis 103. FIG. 1A depicts the cover 104 in a closed position, whereas FIG. 1B depicts the cover in an open position which allows a user to access a battery receiving region 106. In the illustrated embodiment, the battery receiving region 106 includes five (5) battery receiving bays $108_1$, $108_2$, $108_3$, $108_4$, $108_5$.

The first through fourth bays $108_{1-4}$ are configured to receive one or more generally cylindrical batteries having positive and negative terminals disposed on opposite ends of the battery. The batteries are received in the bays $108_{1-4}$ with their longitudinal axes extending generally in the direction 110. The bays $108_{1-4}$ each include movable contact supports $112_{1-4}$ which are disposed generally toward the rear of the respective bays $108_{1-4}$. The supports 112 carry first battery contacts 132a,b,c (see FIG. 1C) which are adapted to make electrical contact with the first terminals of the battery or batteries received in the respective bays $108_{1-4}$. Second, generally stationary battery contacts $114_{1-4}$, which are disposed generally toward the front of the respective bays $108_{1-4}$, are adapted to make electrical contact with the first terminal of the battery or batteries received in the bays $108_{1-4}$.

As will be described further below, the first 132 and second 114 battery contacts are zero insertion and removal force battery contacts. More specifically to the illustrated embodiment, the contact supports 112 are in operative mechanical communication with the cover 104 so that, when the cover is in the open position, the spacing between the contacts 132, 114 is greater than the longitudinal dimension of the battery or batteries to be inserted in the respective bays $108_{1-4}$. As a consequence, the batteries can be inserted in the bays $108_{1-4}$ without overcoming the contact force. When the cover 104 is in the closed position, the spacing between the contacts 132, 114 is such that the contacts 132, 114 make electrical contact with the terminals of the battery or batteries received in the respective bays. Reopening the cover 104 again increases the spacing between the contacts 112, 114 so that the batteries can be removed without overcoming the contact force.

The fifth bay $108_5$ is configured to receive first $116_1$ and second $116_2$ generally rectangular nine volt (9V) batteries for charging. Suitable battery contacts disposed near the bottom of the fifth bay $108_5$ provide the requisite battery connections. Also disposed in the housing 102 is conventional battery charging circuitry. A power cord 118 connects the charger 100 to a suitable power source, for example a wall cube which can be plugged into a standard alternating current (AC) power receptacle. An internally mounted, cover-actuated pushbutton switch automatically activates the charging circuitry when the cover 104 is closed, and a cover-mounted user interface 120 such as a liquid crystal display (LCD) indicates the operational status of the charger 100.

Figure 1C:
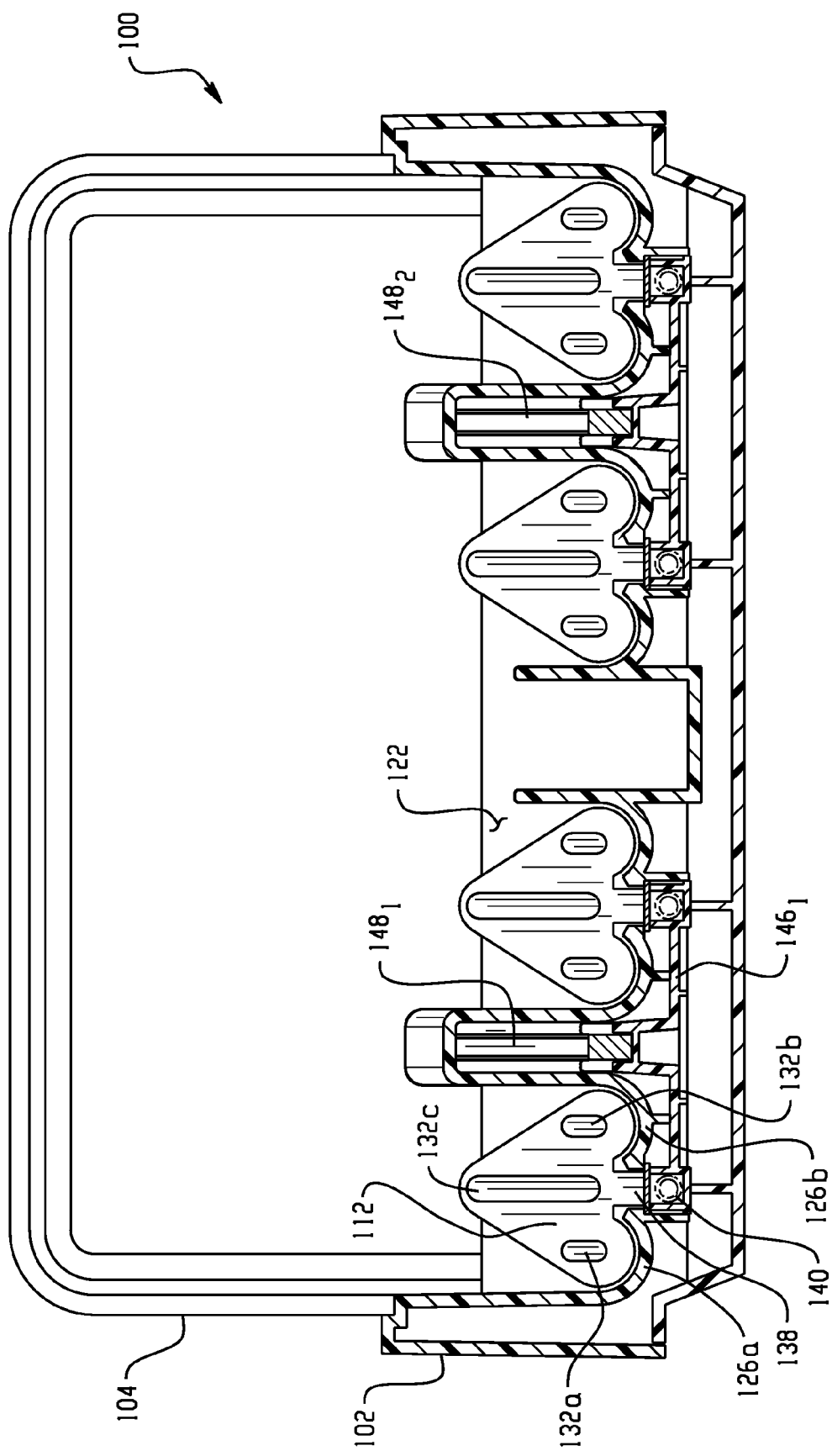
FIG. 1C the sectional view indicated by line 1C-1C of FIG. 1B.
Figure 1D:
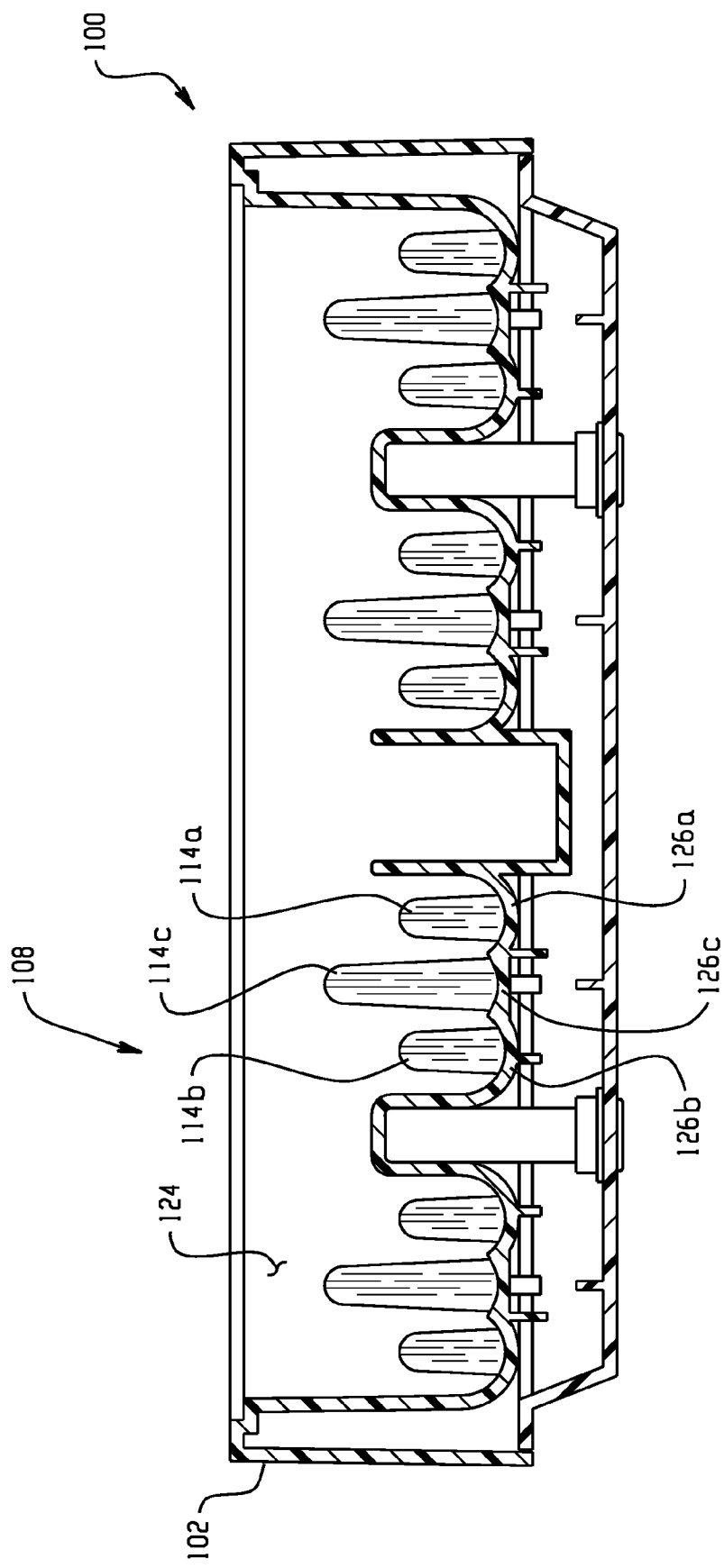
FIG. 1D is the sectional view indicated by line 1D-1D of FIG. 1B.

An exemplary one of the bays $108_{1-4}$ will now be described with additional reference to FIGS. 1C and 1D, it being understood that the first through fourth bays $108_{1-4}$ are similarly configured. Note that the batteries depicted in FIG. 1B have been omitted for ease of explanation.

The bay 108 includes a first, rear end wall 122 and a second, spaced apart front end wall 124. The distance between the walls 122, 124 is greater than the longitudinal dimension of the largest battery to be received in the bay 108.

Disposed at the bottom of the bay 108 is a battery tray which includes first $126_a$ and second $126_b$ outer battery supports and a third, central battery support $126_c$. The radii of the outer battery supports $126_a$, $126_b$ are selected to support batteries having a relatively smaller radial dimension, for example standard AA and AAA size batteries. The radius of the central battery support $126_c$ is slightly larger so as to additionally support batteries of a relatively larger radial dimension, for example standard C and D size batteries.

The second battery contact 114, which is located at the second, front end wall 124, includes first $114_a$ and second $114_b$ outer battery contacts and a third, central battery contact $114_c$. The outer contacts $114_a$, $114_b$ are positioned relative to the outer battery supports $126_a$, $126_b$ so as to make contact with the second terminal of AAA and AA size batteries received in the bay 108. The central contact $114_c$ is likewise positioned relative to the central battery support $126_c$ so as to make contact with the second terminal of AAA, AA, C, and D size batteries.

The contact support 112 is fabricated from a metallic or other conductive material. First 132a, second 132b, and third 132c contacts are formed as protrusions which make electrical contact with the first terminal of the battery or batteries received in the bay 108. The contact support 112 is mounted for slidable motion in a slot 138 formed in the battery tray. As will be appreciated, the direction of motion is generally parallel to the longitudinal axes 110 of the battery or batteries. A spring 140 connected between the contact support 112 and the underside of the battery tray nearer to the front end wall 114 urges the contact support 112 toward the front end wall 14.

Figure 2:
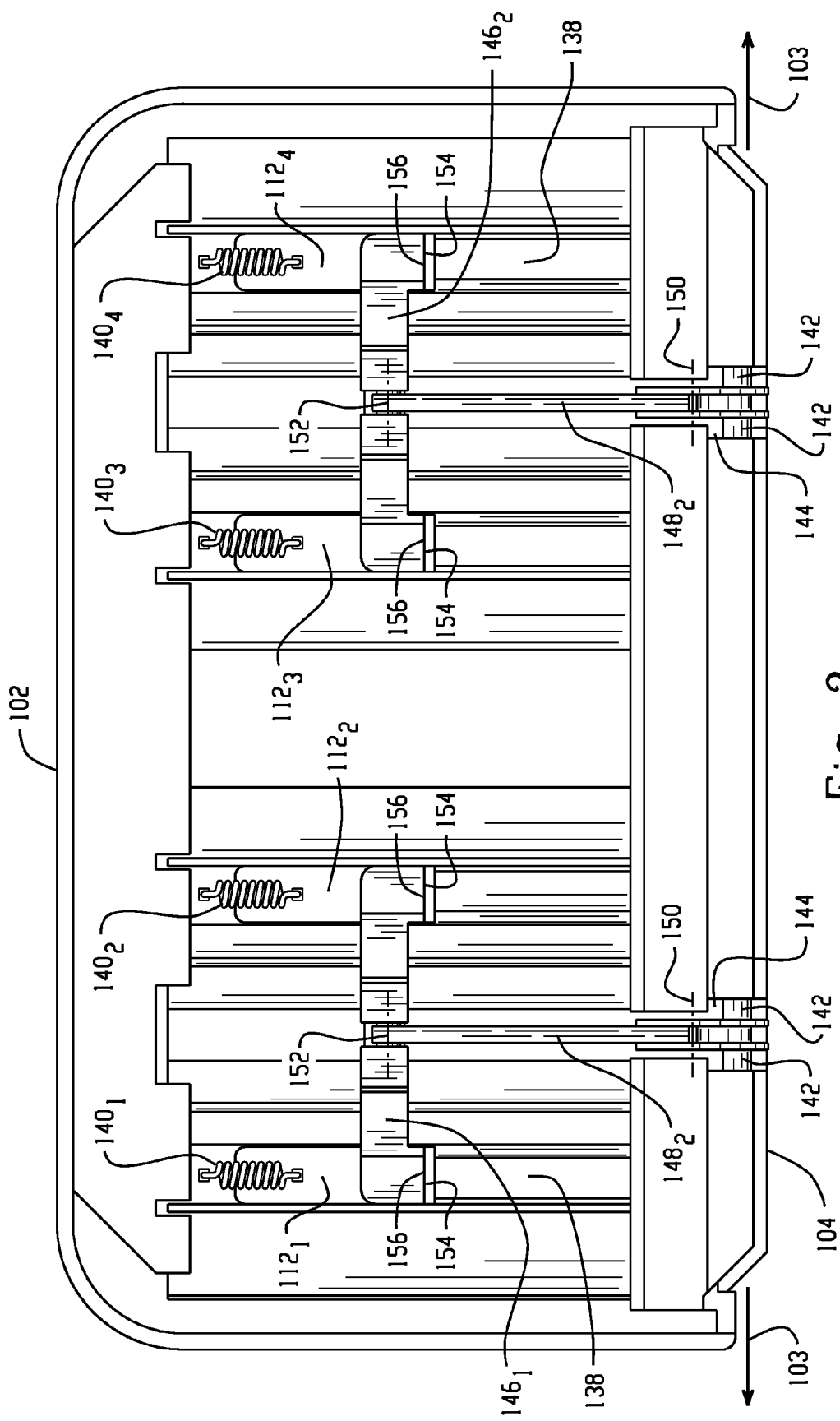
FIG. 2 is a bottom view of a battery charger.

FIG. 2 is a bottom view of the charger 100 with the bottom cover removed for ease of explanation. The cover 104 is pivotally attached to the housing 102 via hinge pins 142 which are advantageously formed as an integral part of the cover 104 and which snappingly engage corresponding recesses 144 in the body 102. First $146_1$ and second $146_2$ slide members are disposed on the underside of the battery trays for slidable motion in the direction 110. The rear portion 152 of the slide members 146 releasably engages front facing shoulders 154 formed on the contact supports 112. More specifically to the illustrated embodiment, the first slide member $146_1$ releasably engages the first $112_1$ and second $112_2$ contact supports, whereas the second slide member $146_2$ releasably engages the third $112_3$ and fourth $112_4$ contact supports. First $148_1$ and second $148_2$ link members are connected between the cover 104 and the respective first $146_1$ and second $146_2$ slide members.

Figure 1E:
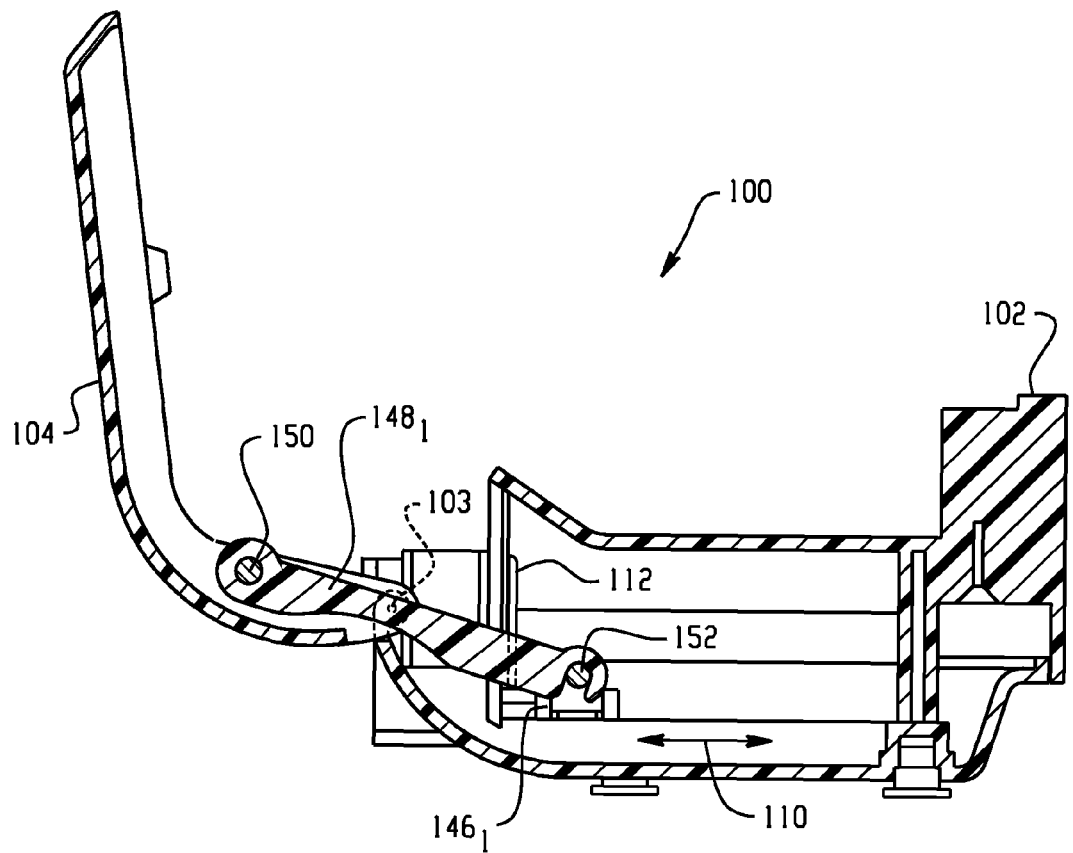
FIG. 1E is the sectional view indicated by line 1E-1E of FIG. 1B, showing the battery charger with a cover open.
Figure 1F:
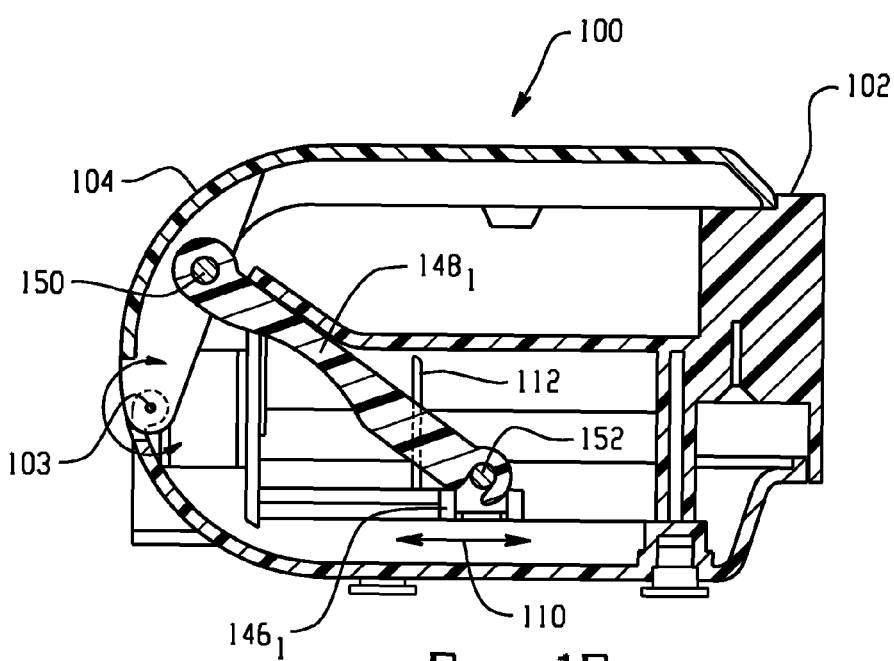
FIG. 1F is the sectional view indicated by line 1E-1E of FIG. 1B, showing the battery charger with the cover closed.

With reference to FIGS. 1E and 1F, a first end of each link member 148 is pivotally connected to the to the cover 104 for rotational motion about a pivot or hinge axis 150, while the second end of each link member 148 is pivotally connected to a respective slide member 146 for rotational motion about a pivot or hinge axis 152.

Opening the cover 104 urges the link members $148_1$, $148_2$ and hence their respective slide members $146_1$, $146_2$ toward the rear of the battery receiving region 106. The rear 154 of the slide members 146 releasably engages the shoulders 156 of the respective contact supports 112, overcoming the force exerted by the springs 140 and thus moving the contact supports 112 toward the rear of the battery receiving region 106. Note that, when the cover 104 is in the open position, a line extending between the link arm 148 pivot axes 150, 152 is located below the cover pivot axis 130. As a consequence, the force exerted by the springs 140 generates a moment about the pivot axis 130 which tends to maintain the cover 104 in the open position.

Closing the cover 104 causes the link members 148 and the slide members 146 to move toward the front of the battery receiving region 106. As a consequence, the springs 140 urge the contact supports 112 forward in coordination with the closing of the cover 104. If a battery is not installed in a given bay $108_{1-4}$, the contact support 112 moves forward to the limit of its travel. Where a battery (or batteries) is received in a bay $108_{1-4}$, a contact 132 engages the first end the battery, thus urging it toward the second battery contact 114. When the second end of the battery contacts the second battery contact 114, the contact support 112 is unable to move forward and the spring 140 applies a suitable contact force. The rear 154 of the respective slide member 146 disengages from the shoulder 156 of the respective contact support 112 so that the link member 148 and the slide member 154 continue to move forward in coordination with the closing of the cover 104.

Pivoting the cover 104 thus retracts each of the movable battery contacts 114, thus allowing the user to insert batteries in and/or remove batteries from the desired bays $108_{1-4}$ with zero insertion or removal force. As will also be appreciated, the forward travel of the respective contact supports $112_{1-4}$ depends on the size of the battery or batteries received in its corresponding bay $108_{1-4}$. As a result, the user may insert different size batteries in each bay $108_{1-4}$. Thus, for example, a user may elect to insert a single C size battery in one of the bays, one or more AAA size batteries in another of the bays, a single D size battery in still another bay, one or more AA size batteries in the fourth bay. Of course, the foregoing is but one possibility, and other combinations are possible.

Still other variations are contemplated. For example, one or more of the bays $108_{1-4}$ may be configured to selectively receive a single D size battery, a single C size battery, up to four (4) AA size batteries, or up to four (4) AAA size batteries. The battery supports and contact configuration of a device having two (2) such bays $108_1$, $108_2$ is illustrated in FIGS. 3A-3D.

Figure 3A:
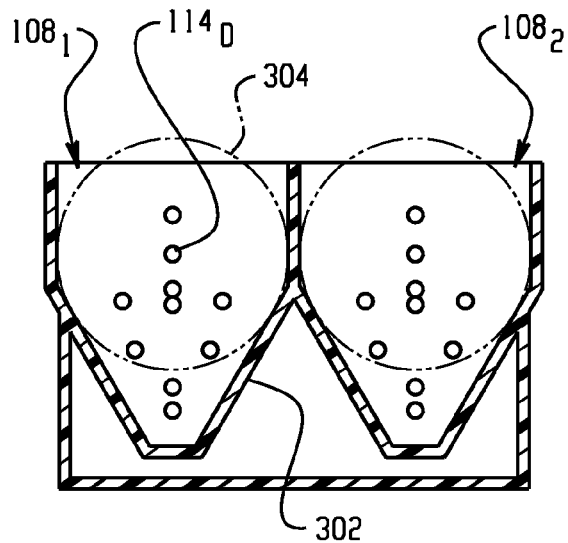
FIGS. 3A through 3D depict bays of a battery charger.

An exemplary bay 108 will now be described, it being understood that the first $108_1$ and second bays $108_2$ are similarly configured. The bay 108 includes a battery support 302 having a generally funnel or V-shaped section. With reference to FIG. 3A, the battery support 302 supports a D-size battery 304 so that its longitudinal axis is positioned at the horizontal center of the bay 108. A battery contact $114_D$ is positioned relative to the battery support 302 so as to make electrical contact with the second terminal of the battery 304.

Figure 3B:
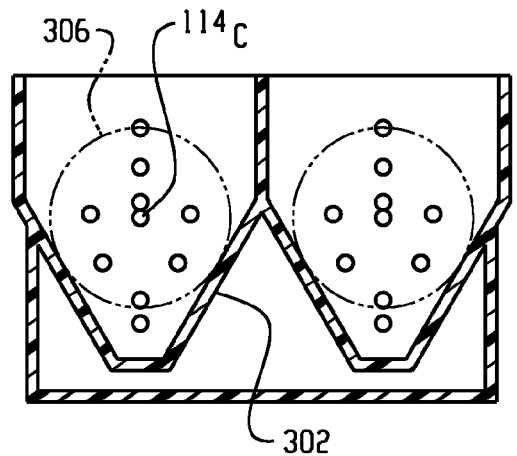

With reference to FIG. 3B, the battery support 302 also supports a C-size battery 306 so that its longitudinal axis is positioned at the horizontal center of the bay 108 and slightly below that of the D-size battery 304. A battery contact $114_C$ is positioned relative to the battery support 302 so as to make electrical contact with the second terminal of the battery 304.

Figure 3C:
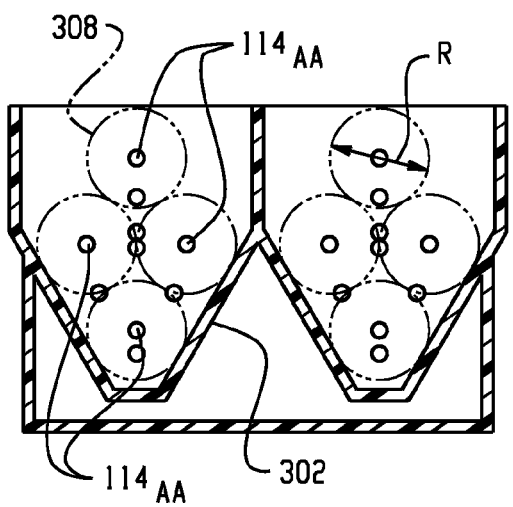

Turning now to FIG. 3C, the battery support 302 also supports up to four (4) AA size batteries 308 in a two (2) dimensional close packed array in which adjacent rows and columns are offset by one-half (½) the battery radial dimension R. A plurality of battery contacts $114_{AA}$ are positioned relative to the battery support 302 so as to make electrical contact with the second terminals of the batteries 308. As can be seen, a centroid of the array is coincident with a horizontal center of the battery support.

Figure 3D:
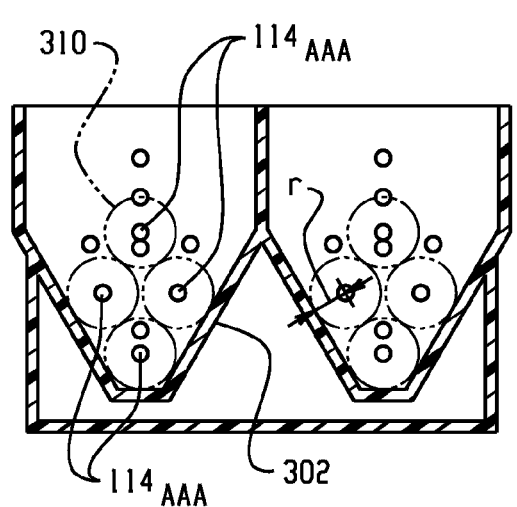

With reference now to FIG. 3D, the battery support 302 similarly supports up to four (4) AAA size batteries 310, again in a two (2) dimensional close packed array with adjacent rows and columns offset by the radius r of the batteries 310. A plurality of battery contacts $114_{AAA}$ are positioned relative to the battery support 302 so as to make electrical contact with the second terminals of the batteries 310.

The contacts 132 are likewise configured to make electrical contact with the first terminals of the respective batteries 304, 306, 308, 310. Note that the various contacts 114 need not be physically or electrically discrete; some or all of them may be combined so as to provide the desired electrical connections. In one example, the D size battery contact $114_D$, the C size battery contact $114_C$, one of the AA size battery contacts $114_{AA}$, and one of the AAA size battery contacts $114_{AAA}$ are combined in a single contact, and the remaining AA size battery contacts $114_{AA}$ and AAA size battery contacts $114_{AAA}$ are likewise combined in pair-wise fashion. Note also that one or more of the contacts 132 may also be electrically discrete.

A particular advantage of the arrangement described above is that the battery support 302 tends to function as a hopper, thus using the force of gravity to funnel the battery or batteries inserted into a bay 108 into their correct position(s). As a consequence, the batteries are largely self positioning, particularly when the battery support 302 is used in combination with zero insertion force battery contacts 112, 114 and the hopper opening is disposed generally physically upwardly in the absolute sense. While the illustrated hopper accommodates one (1) C or D size batteries or up to four (4) AAA or AA size batteries smaller or larger hoppers which accommodate fewer or larger batteries or combinations of battery sizes may also be implemented.

Still other variations are contemplated. For example, one or more of the bays 108 may be configured to receive only a single battery. Thus, a bay 108 may be configured to receive a single D size battery, a single C size battery, a single AA size battery, or a single AAA size battery. In yet another alternative, one or more of the bays 108 may also be configured to receive multiple batteries of only a single size or of a relatively limited range of sizes. For example, a bay 108 may be configured to receive a plurality of AA or AAA batteries, or otherwise receive any two (2) or more battery sizes selected from the group of AAA, AA, C, and D-size batteries. Still other battery sizes are also contemplated.

Greater or lesser numbers of bays 108 may also be provided. One or more of the bays 108 may also be provided with its own cover 104. A given cover 104 may also actuate the contacts 132 or more than one but less than all of the bays 108. A particular advantage of such arrangements is that they facilitate the independent operation of the various bays 108, for example where the user wishes to insert batteries in or remove batteries from a first bay while the batteries in another bay continue to charge.

The contacts 132, 114 may also be configured so that, when the cover 104 is in the open position, the spacing between the contacts 132, 114 is approximately equal to the longitudinal dimension of a battery to be received in the bay 108. As will be appreciated, such an arrangement simplifies insertion and removal of the batteries, especially compared to arrangements in which the contact supports 112 must be grasped and moved by the user. The contacts 132, 114 may also be configured to provide substantially zero insertion and removal force contacts. More particularly, the contact spacing is established so that while the contact force applied during insertion and/or removal of a battery is non-zero, it is nonetheless less than the contact force applied during charging.

In another alternative implementation, one or more of the bays 108 is provided with a lever which operates similarly to the cover 104. The lever may also be configured as a thumbwheel. In still another implementation, the movable battery contacts 112 may be actuated by a user operated slider accessible from the top of the charger 100, with a detent holding the slider in the open or retracted position.

Various link member 148 and slide member 146 implementations are also contemplated. For example, three (3) or more bays may share a common link member 148; a link member 148 may be provided in connection with each bay 108. The slide member or members 146 may be also be omitted, with a protrusion, pin, or the like extending from the link member 148 and engaging the moving battery contact 114.

Figure 4:
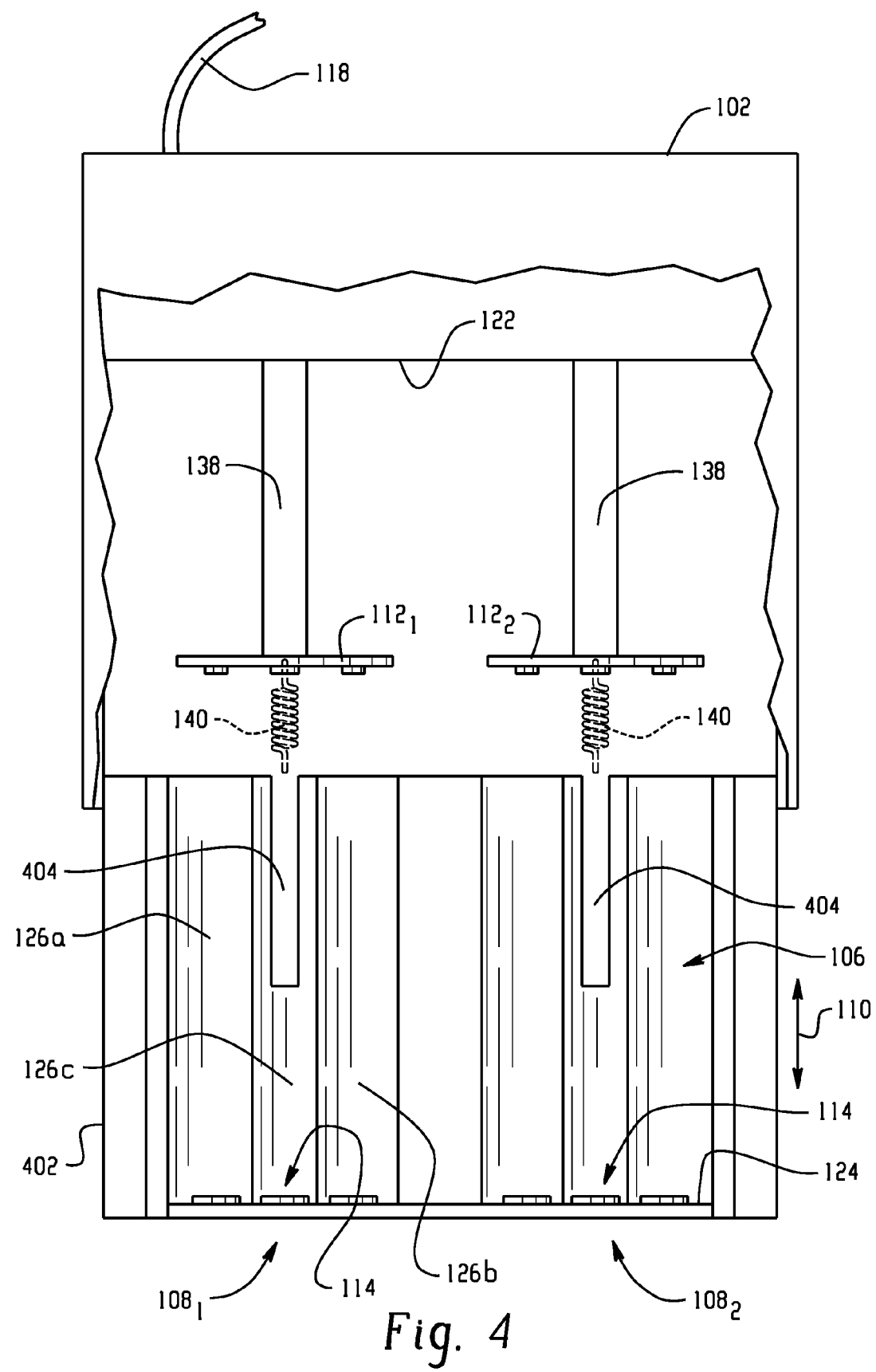
FIG. 4 is a top view of a battery charger.

The foregoing discussion has focused on an arrangement in which the battery trays are substantially stationary with respect to the body 102. Turning now to FIG. 4, a charger 100 includes a generally sliding or telescoping tray 402 located at the front of the charger 100 and which is movable relative to the body 102 in the direction 110. The movable battery contacts 112 are likewise movable in the direction 110 in the slots 138, with springs 140 urging the movable contacts 140 toward the front of the body 102. Suitable material free regions or slots 404 provided in the tray 402 provide clearance for the movable contacts 112 and/or the springs 140. In one implementation, the tray 402 is actuated manually by the user, with a suitable latch maintaining the tray 402 in the closed position. In another implementation, the tray is motorized.

With the tray 402 in the open position (as shown in FIG. 4), the springs 140 urge the movable battery contacts 112 toward the front of the charger 100. Where a battery (or batteries) is received in a bay 108, closing the tray 402 causes the first end of the battery to engage the corresponding contact support 112. If the second end of the battery is not already in contact with the front end wall 124 (or the contacts 114, as the case may be), the movable contact 114 tends to urge the battery forward. Upon reaching the front of the bay 108, the second end of the battery then causes the contact support 112 to retract in coordination with the closing of the tray 402.

Figure 5:
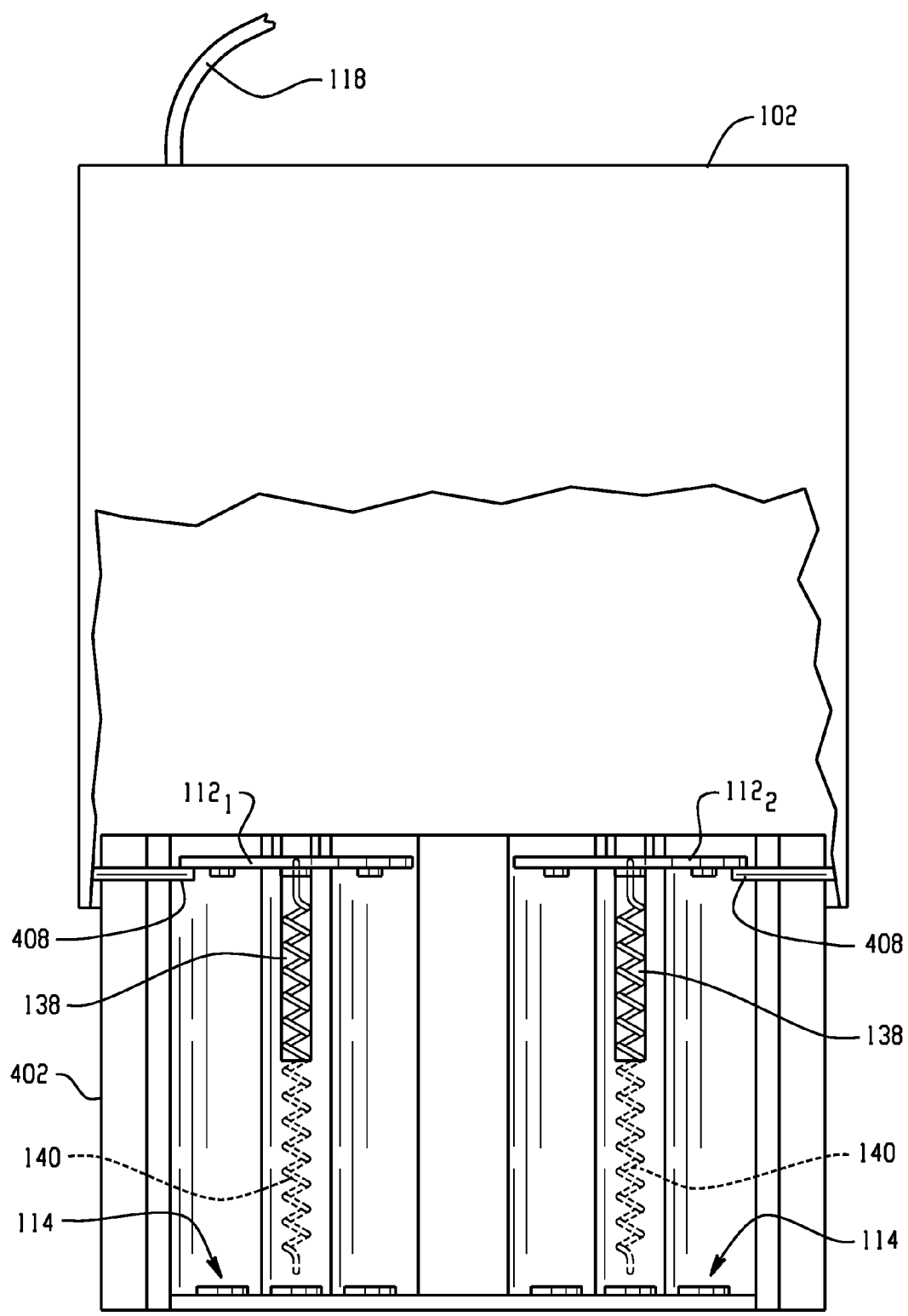
FIG. 5 is a top view of a battery charger.

In another variation which is illustrated in FIG. 5, the contact supports 112 may be carried by the tray 402, with springs 140 urging the movable contact supports 112 toward the front of the tray 402. When the tray 402 is opened, one or more protrusion(s) or pin(s) 408 extending from the bottom or sides of the housing 102 engage forward facing shoulders disposed on the movable contacts 112, thereby retracting them. When the cover is closed, the springs 140 urge the movable contacts 112 forward in the tray 402.

According to yet another implementation, the first 112 and second 114 contacts are formed at the first 122 and second 124 ends of the tray 402. A spring 140 urges the tray 402 toward the closed position, while a detent holds the tray 402 in the open position.

Figure 8:
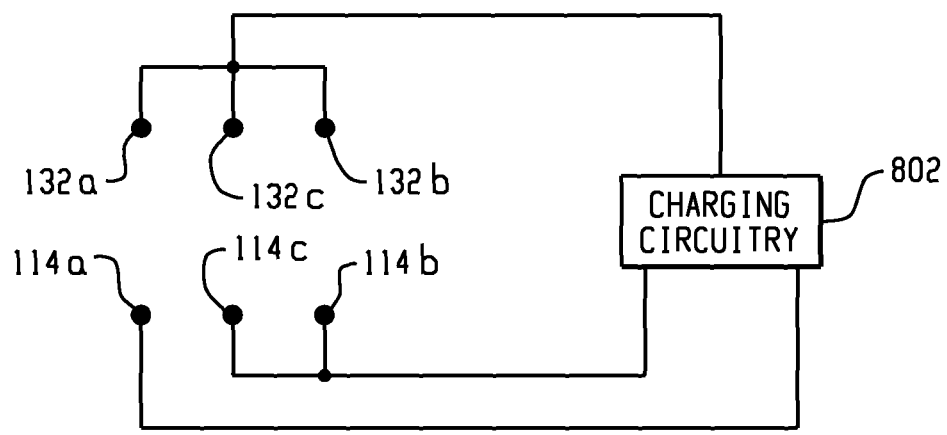
FIG. 8 depicts battery contact electrical connections.

Various electrical arrangements are also contemplated. For example, a separate charging channel may be provided each of the bays 108. In one such implementation, the battery contacts of a given bay are connected to the battery charging circuitry 802 as shown in FIG. 8. A particular advantage of such an arrangement is that the charging energy supplied to the outer batteries may be applied independently. However, it will also be appreciated that the second contacts 114*a,b,c* may also be connected together so that the outer batteries are connected electrically in parallel during charging. Similar connection schemes may also be implemented in connection with the arrangement of FIG. 3D, taking into account the relatively larger number of batteries.

Figure 6:
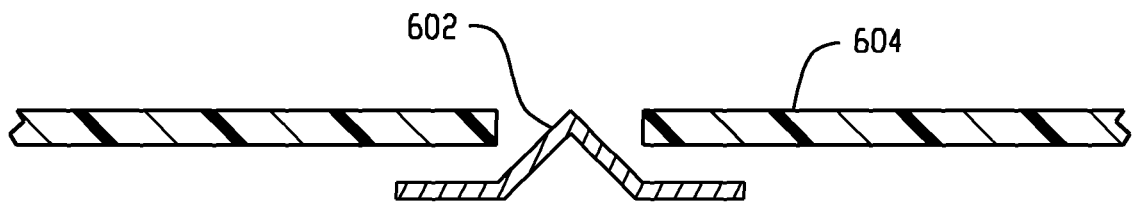
FIG. 6 depicts a recessed battery contact.

As illustrated schematically in FIG. 6, the first or second battery contacts 602 may be recessed in their respective support 604. Where a battery is inserted with the incorrect polarity, the negative battery terminal does not make electrical contact with the recessed contact 602. As a consequence, charging energy is not applied with the incorrect polarity.

In still another arrangement, the battery contacts 132, 114 and the charger electrical circuitry are designed to be polarity agnostic. For the purposes of the present application, polarity agnostic is defined to mean that the battery contacts 132, 114 will make electrical contact with either of the positive and negative terminals of a battery and that the electrical device will operate properly (e.g., a battery charger will charge batteries or a battery powered device will perform the function of the device) irrespective of the polarity in which the battery is inserted in a bay 108.

Figure 7:
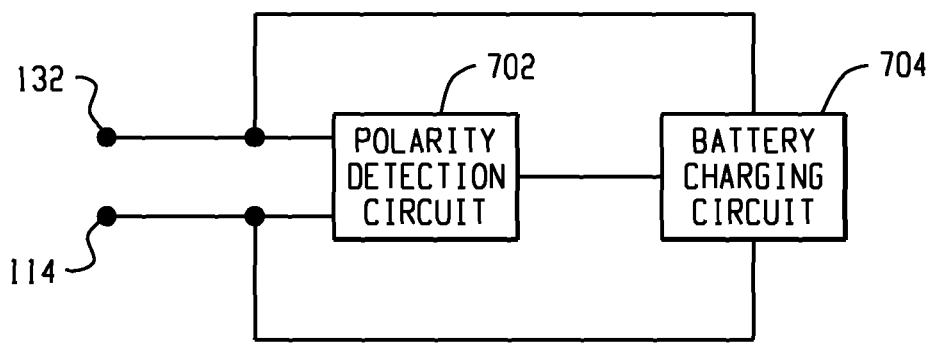
FIG. 7 is a block diagram of a polarity agnostic charging circuit.

A block diagram of an exemplary polarity agnostic battery charging circuit is depicted in FIG. 7. As shown at FIG. 7, the charging circuit includes a polarity detection circuit 702 and battery charging circuitry 704. The polarity detection circuitry 702 determines the polarity of one or more of the batteries received in a bay 108. The battery charging circuitry 704 applies the desired charging energy to the battery or batteries, with the polarity of the charging energy selected based on the detected battery polarity. Various polarity detection techniques are known in the art and can be selected based on application specific requirements. In such a configuration, the respective first 132 and second 114 battery contacts for the various batteries in a given bay 108 are not electrically connected so that the polarity of each battery may be individually detected and accounted for.

Figure 9:
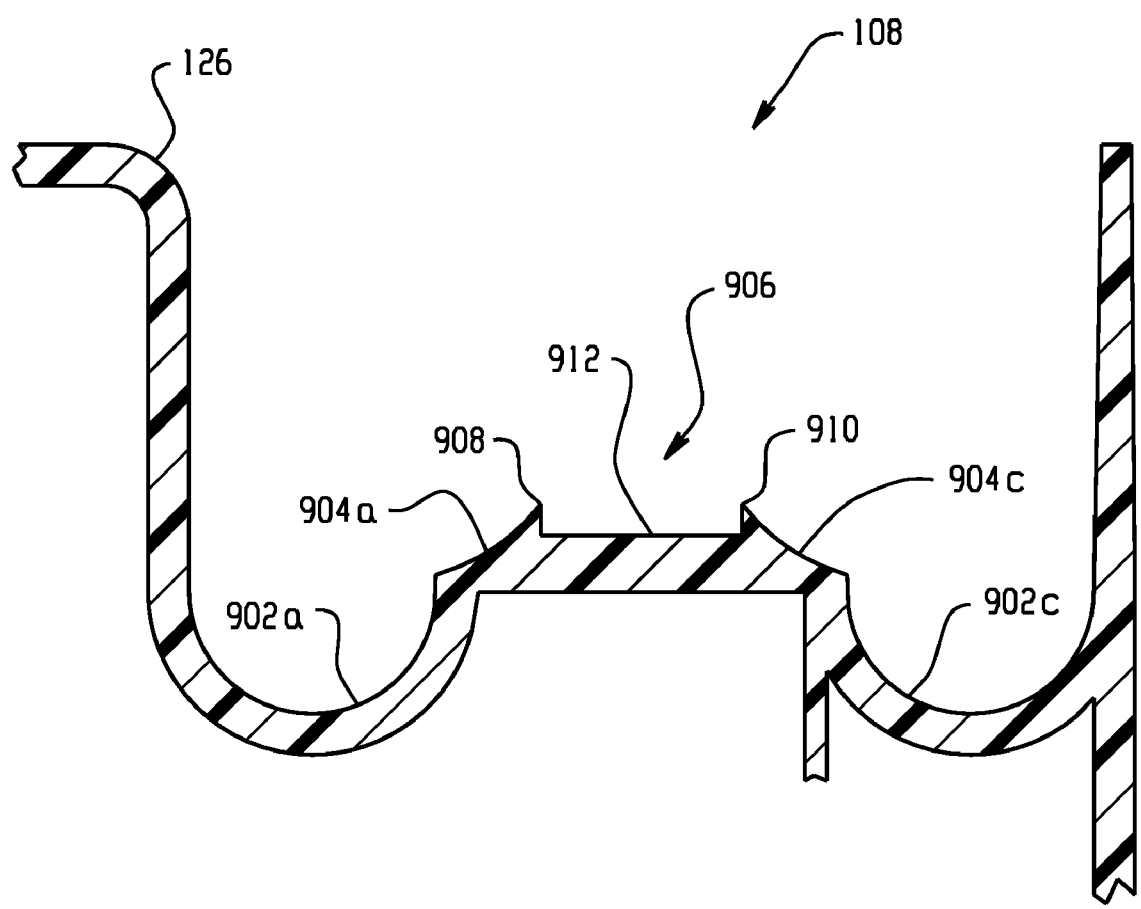
FIG. 9 is a cross-sectional view of a battery tray.

FIG. 9 is a cross sectional view of an alternate implementation of a battery tray 126 for an exemplary bay 108. The tray 126 is depicted generally at the position of section 1D-1D shown in FIG. 1. The tray includes first 902*a* and 902*c* second outer battery supports which are dimensioned to support AAA size batteries. Additional outer supports 904*a*, 904*b* are likewise dimensioned to support a pair of relatively larger AA size batteries. A central region 906 includes a pair of upstanding, spaced apart protrusions 908, 910 which are configured to support AAA, AA, C, or D size cells. As illustrated, the spacing between and height of the protrusions are selected so that the batteries do not contact and are thus unsupported by the surface 912. Thus, the batteries are supported substantially along two (2) lines defined by the protrusions 908, 910. Alternately, the protrusions 908, 910 may be dimensioned so that a given size battery (e.g., a AAA size battery) is also supported by the surface 912. It should also be noted that, as illustrated, the bay 108 will concurrently accept up to three (3) AAA or AA size batteries, with one (1) battery disposed in each of the outer positions and a third battery disposed in the central position.

Figure 10:
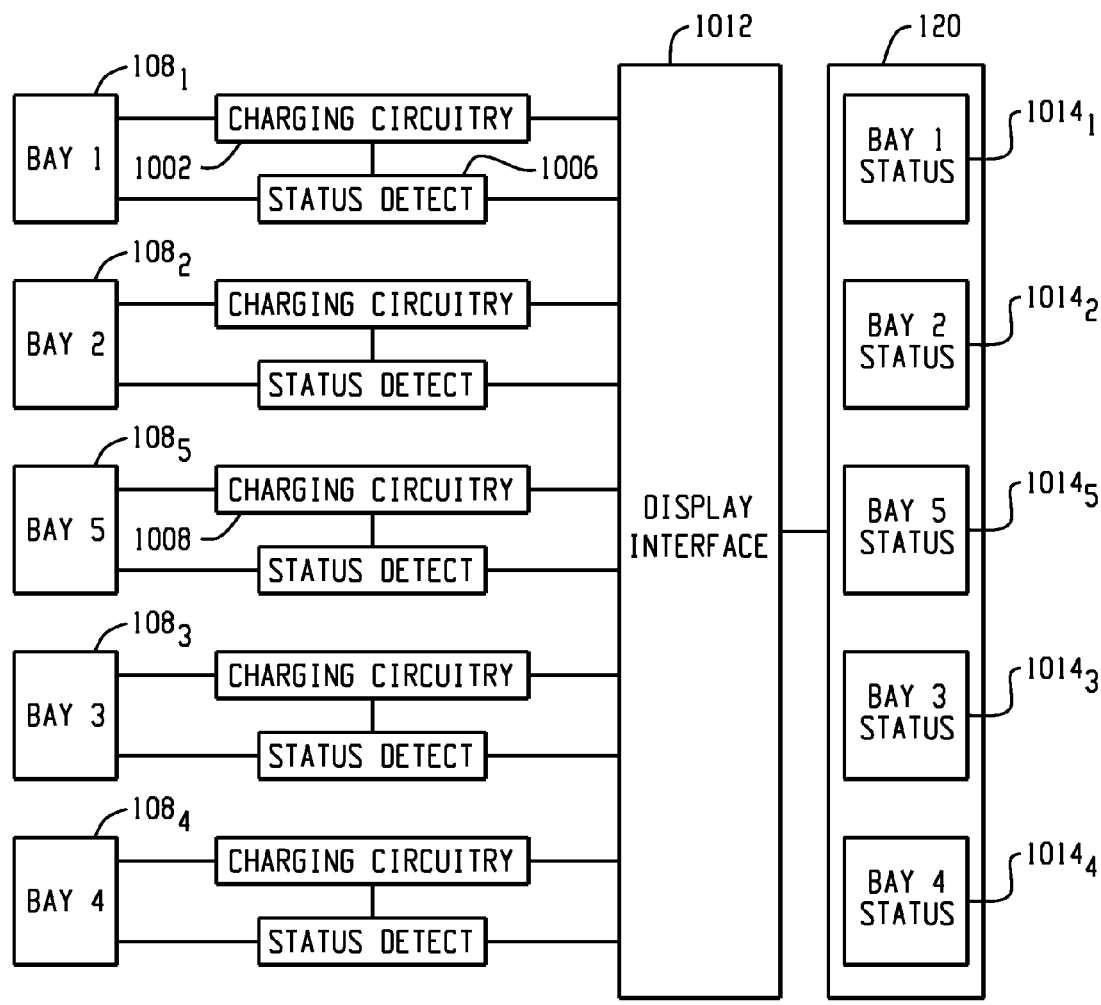
FIG. 10 is a functional block diagram of battery charger electrical circuitry.

Turning now to FIG. 10, operation of the user interface will now be described in relation to a charger 100 having five (5) battery receiving bays $108_{1-5}$ configured as described above in connection with FIG. 1. In the case of the bays $108_{1-4}$, charging circuitry 1002 is operatively connected for charging a battery received by the central 126*c* battery support or a pair of batteries received by the other outer battery supports 126*a*, *b*. In the case of the bay $108_5$, the charging circuit 1008 is operatively connected for charging one (1) or two (2) 9V batteries $116_1$, $116_2$.

The status detectors 1006, which are operatively connected to the charge circuits 1002 and the bays 108, provide status information as to the battery or batteries, if any, installed in the respective bays to a display interface 1012, which in turn supplies the necessary signals for driving the display 120.

The display 120 includes five regions $1014_1$, $1014_2$, $1014_3$, $1014_4$, $1014_5$, each corresponding to one of the battery receiving bays $108_1$, $108_2$, $108_3$, $108_4$, $108_5$. As will be described in further detail below, each region $1014_{1-5}$ displays status information such as the number and size of the batteries received in the respective bays, their good/bad status, and fuel gauge or other information indicative of the battery state of charge information. The display 120 may also include one or more regions 1016 which provides a power indicator, the time and/or date, or other more general information.

Figure 11:
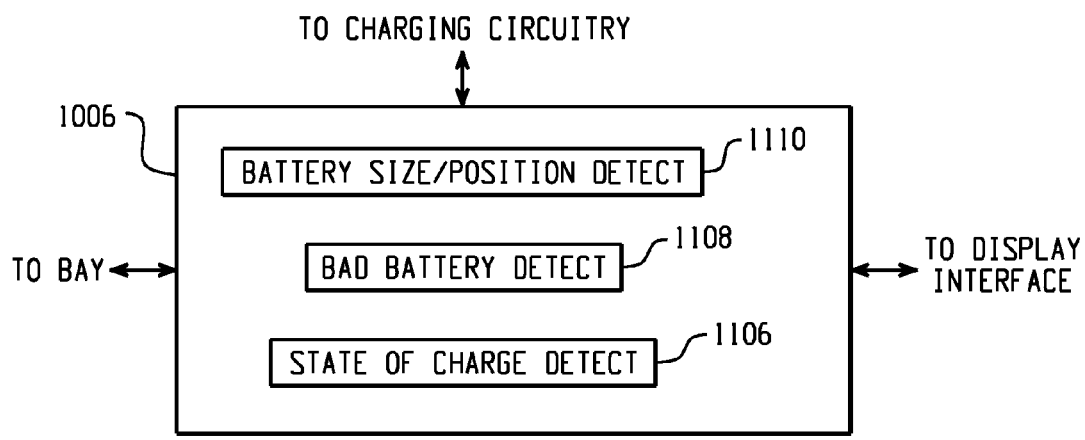
FIG. 11 is a functional block diagram of a charging channel.

An exemplary status detector 1006 will now be described with reference to FIG. 11. As illustrated, the status detectors 1006 include battery size/position detectors 1110, a state of charge detector 1106, and a bad battery detector 1108.

The state of charge determiner 1106 determines the state of charge of the battery. In one implementation, the state of charge determiner 1106 estimates an initial battery state of charge (or stated conversely, the depth of discharge) based on the battery's open circuit voltage when first received in the channel and uses the known negative delta voltage detection technique (which detects a dip in battery voltage which occurs when a battery becomes fully charged) to determine when the battery is charged, with intermediate charge states being estimated based on elapsed charge time. In another technique which is particularly well-suited for use with 9V batteries 116 such as those associated with the channels 1008, the state of charge determiner 1106 does not measure the state of charge of the battery, but instead estimates the battery state of charge based on an elapsed charging time.

The bad battery detector 1108 detects the presence of a bad battery using known techniques, which typically include one or more of detecting an abnormally low or high battery open circuit voltage upon battery insertion, a high internal resistance determined by abnormally high voltage under charge and/or a shorted battery determined by abnormally low voltage under charge.

The battery size/position detector 1110 determines the size and/or position of the batteries, if any, disposed in the various bays 108.

The battery charging circuitry 1104 provides energy for charging the battery or batteries. The charging circuitry 1104 advantageously adjusts the charging energy applied to the battery based on the information from the state of charge determining circuitry 1106 and the battery size/position detector 1110, for example to discontinue charging or to provide a maintenance charge after the battery has become fully charged and to adjust the charging energy as a function of the installed battery size. Note that one or more of the channels may also be polarity agnostic.

Various electrical implementations of the charging circuitry 1002 and status detectors 1006 are contemplated. For example, they may be implemented using analog, digital, or microprocessor-based electrical circuitry, or combinations thereof. It will also be appreciated that some or all of the described functionality may be multiplexed among the various bays or further integrated within a bay 108. Various battery charging circuits 1002 are known to those of ordinary skill in the art and may be implemented based on the number, chemistry, and storage capacity of the batteries to be charged, the desired charge time, efficiency, cost, and other relevant considerations.

Figure 12A:
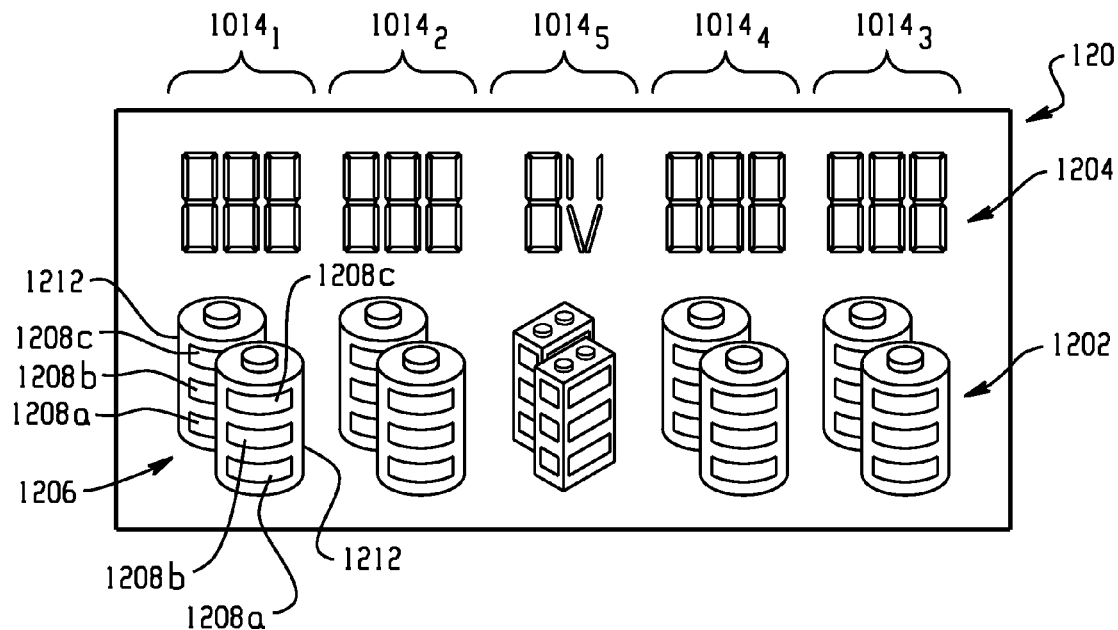
FIGS. 12A, 12B, and 12C depict displays.

One suitable display 120 arrangement is shown in FIG. 12A. As illustrated, each region 1014 includes an iconic or graphical display portion 1202 and a textual display portion 1204. The iconic display portion 1202 advantageously includes an icon or graphical representation 1206 of one or more batteries and a fuel gauge or charge state indicator 1208. The number of batteries displayed in the iconic display portion 1202 preferably corresponds to the number of batteries which can be received in the bay 108. Also to the illustrated implementation, the fuel gauge indicator 1208 includes three (3) bars 1208a, 1208b, 1208c. It should also be noted that the display 120 is preferably oriented on the charger 100 so that the position of the various regions 1014 corresponds generally to the locations of the respective bays 108.

The textual portion 1204 displays textual information relevant to a given bay. In the example of FIG. 12, the textual information is presented as seven (7) segment characters, can be used to display both letters and numerals. In the case of the regions $1014_{1-4}$, the textual portion displays up to three (3) characters, while the textual portion associated with the region $1014_5$ displays up to (2) characters.

Figure 12B:
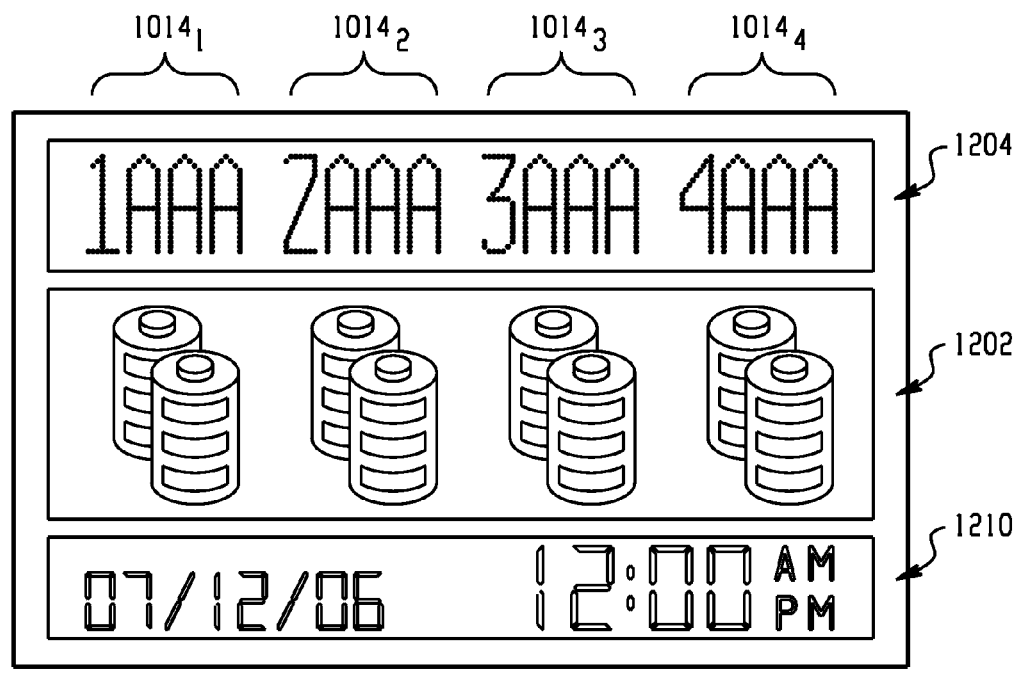

Another suitable arrangement of the display is shown in FIG. 12B, in this case for an exemplary charger 100 which includes four bays $108_{1-4}$ configured generally as described above. As illustrated, the textual portion 1204 is implemented as a dot matrix display, with each region 1014 displaying up to four (4) characters, one of which includes a bay number or identifier. The display 120 also includes a region 1210 which is used to display the date and time.

Various display 120 implementations are contemplated. While the above discussion has focused on an LCD-based display, light emitting diode (LED), vacuum fluorescent, plasma, or other display technologies may be used. Moreover, the display 120 may also be implemented using multiple discrete displays. It will also be appreciated that different icons and arrangements of icons and/or textual elements may also be provided. In one such implementation, for example, the battery sizes are indicated by differently sized icons. In still another, the number of batteries and/or an estimated remaining charge time is displayed textually.

Figure 15A:
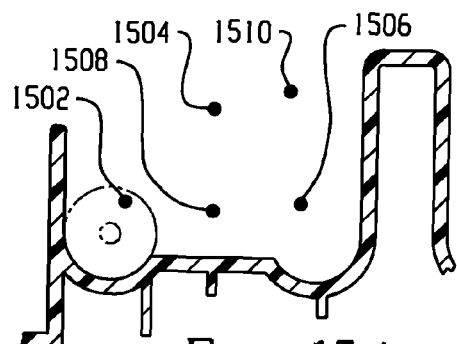
FIGS. 15A-N depict configurations in which batteries are inserted in a battery charger.
Figure 15B:
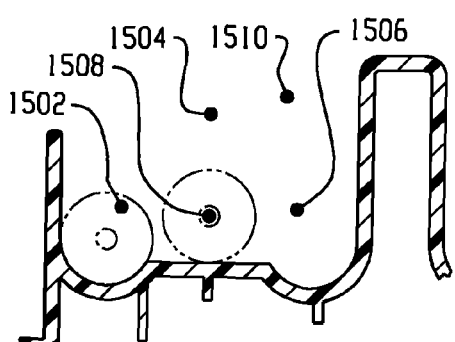
Figure 15C:
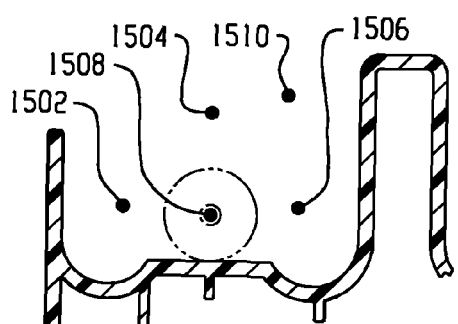
Figure 15D:
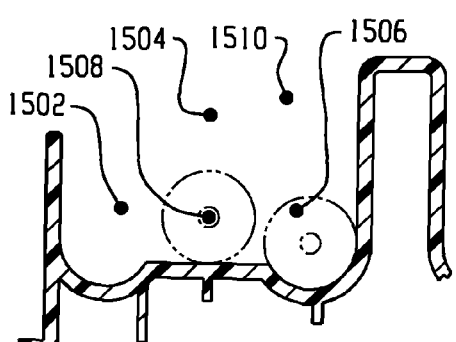
Figure 15E:
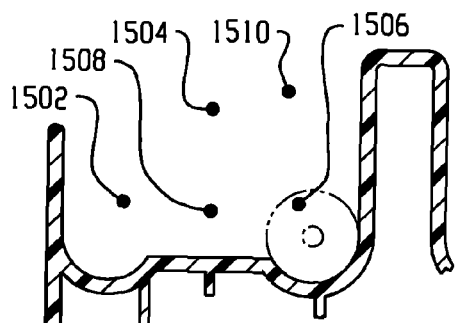
Figure 15F:
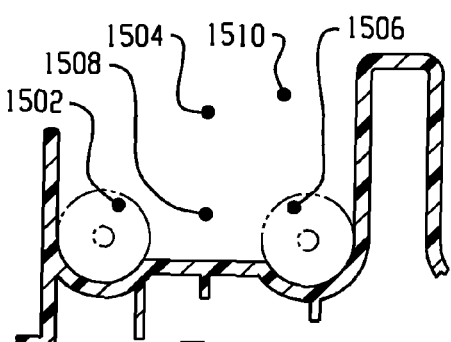
Figure 15G:
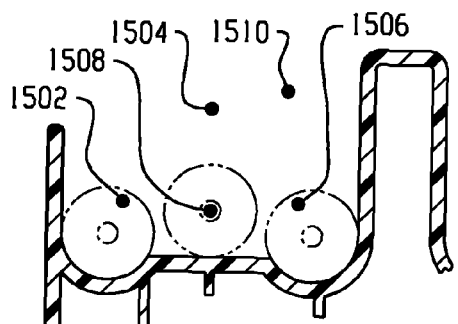
Figure 15H:
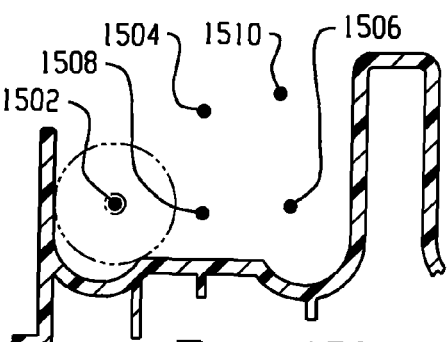
Figure 15I:
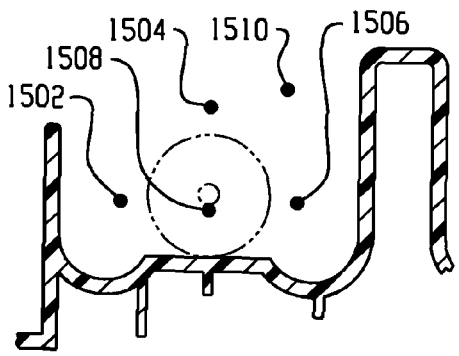
Figure 15J:
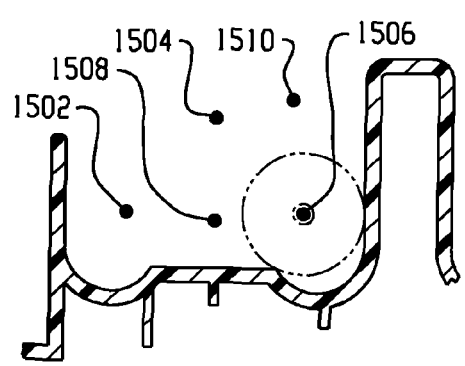
Figure 15K:
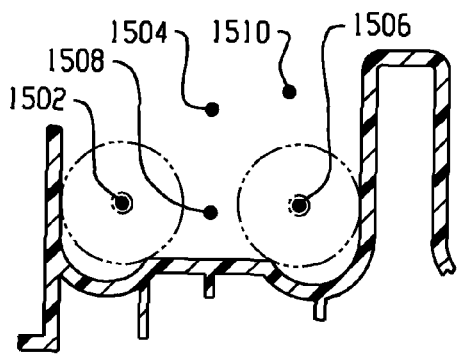
Figure 15L:
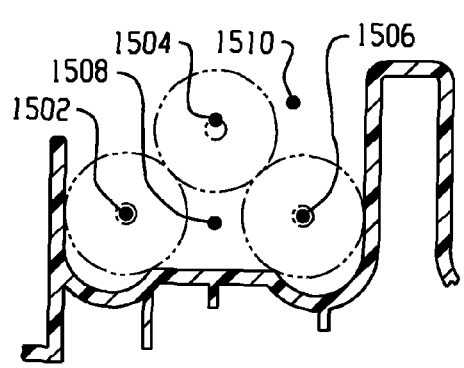
Figure 15M:
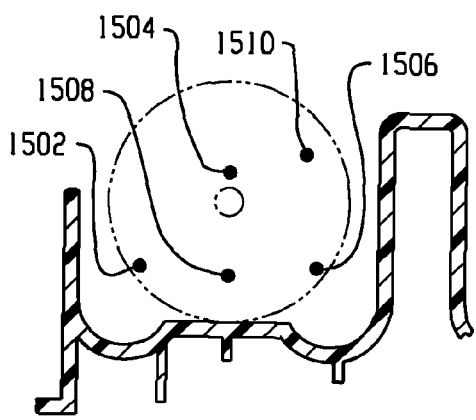
Figure 15N:
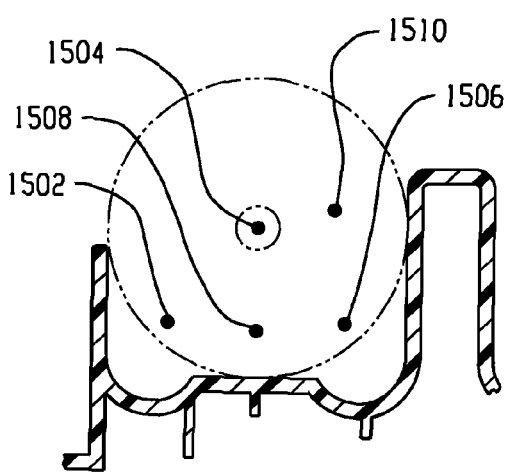

With reference now to FIGS. 14 and 15A-N, the operation of the bays $108_{1-4}$ will be described in greater detail. As illustrated, each of the bays $108_{1-4}$ includes switches K2L 1502, K1 1504, K2R 1506, AA sense 1508, and C/D sense 1510 which are used by the battery size/position detectors 1110 to determine the size and position of the batteries or batteries received in the respective bays 108. The switches 1502, 1504, 1506, 1508, 1510 are mounted in the front end wall 124 of each bay $108_{1-4}$. Switches K2L and K2R 1502, 1506 are located relative to the outer battery supports 126a, 126b so as to be actuated when AA-size batteries are received in the respective outer positions. Switch K1 1504 is located relative to the center support 126c so as to be actuated when a D-size battery is received in the center position, or where three (3) AA-size batteries are received in a bay 108. Switch AA sense 1508 is actuated when a AAA-battery is received in the center position. Switch C/D sense 1510 is actuated when either a C or D-size battery is received in the center position. A further switch (not shown) is operatively connected to the negative battery support 112 so as to determine its longitudinal position and provide a further indication of the size of the batteries (if any) received by the bays 108.

FIG. 14 further depicts the relationship between various configurations in which batteries are received and the operation of the charger 100. The column labeled "Drawing Figure" refers to the drawing figure (i.e., FIG. 15A-N) which illustrated the relevant configuration. The columns labeled "Battery Position" and "Switch Position" describe the location and sizes of the various batteries and the actuation status of the switches 1502, 1504, 1506, 1508, 1510. The column labeled "Charging Rate" shows the rate at which charging energy is applied. The column labeled "LCD Panel" depicts the text displayed on the relevant textual display portion 1204, while the column labeled "LCD Icon" depicts the icon or icons displayed in the relevant graphical display portion 1202. The column labeled "Charging Note" describes the active charging channel 1002₁, 1002₂ (i.e., the center or outer channel), if any.

As will be appreciated, a single AAA, AA, C, or D-size battery may be inserted in the center position for charging, while a pair of AA or AAA-size batteries may be received in the outer positions. Where three AAA size batteries are inserted, as illustrated in FIG. 15G, the only the center channel is operative. Where three AAA cells are inserted, as illustrated in FIG. 15L, only the center channel is again operative. Note that the geometry of the central protrusions 132, of the negative battery contacts 112 are adjusted to accommodate the desired electrical connections. More particularly the upper and lower portion of the protrusions protrudes slightly further from the side protrusions 132a,b that only the central battery makes electrical contact.

Figure 12C:
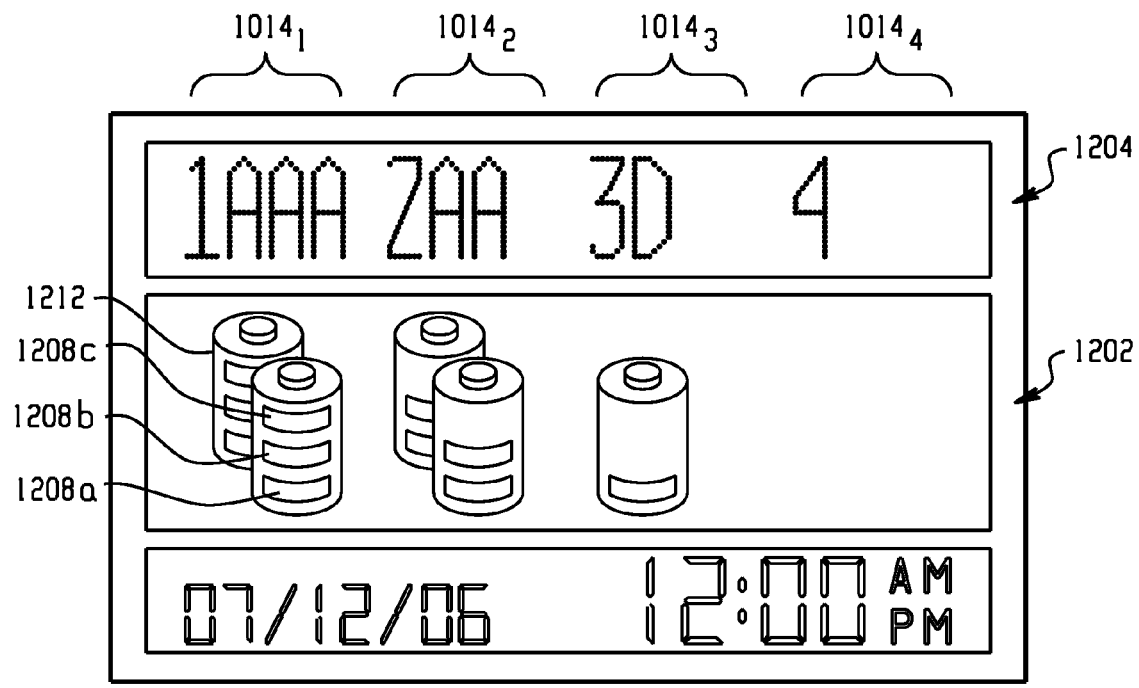

Turning now to FIG. 12C, operation of the display 120 shown in FIG. 12B will now be described in the context of an exemplary situation in which the first bay 108₁ contains two (2) AAA-size batteries, the second bay 108₂ contains two (2) AA-size batteries, the third bay 108₃ contains one (1) D-size battery, and the fourth bay 108₄ bay is empty. As can be seen, the textual display portion 1204 associated with the various regions 1014₁₋₄ indicates the size of the batteries received in the respective bays 108₁₋₄, while the iconic display portion 1202 of each display region 1014 indicates the number of batteries received in the respective bay 108. Thus, in the case of regions 1014₁, 1014₂, two (2) battery icons are displayed. In the case of the region 1014₃ only a single battery icon is displayed. In the case of the region 1014₄, no battery icons are displayed.

The fuel gauges 1208 associated with the various regions 1014₁₋₄ indicate the charge state of the batteries received in the respective bays 108₁₋₄. The battery icon and/or the fuel gauge displays may be dynamically altered to provide a graphic indication of one or both of the charging status, charge state, and good/bad status of the respective batteries. In one implementation, this may be achieved by varying the blink state or otherwise varying the indication state of the graphical elements as shown in Table I:

TABLE I

| State of Charge | Charge Status | Fuel Gauge Segment 1208a | Fuel Gauge Segment 1208b | Fuel Gauge Segment 1208c | Icon 1212 | Blink Sequence |
|---|---|---|---|---|---|---|
| Empty/Low Charge | Charging | Blink | Blink | Blink | Solid | 1208a on; 1208a and 1208b both on; 1208a, 1208b and 1208c all on; 1208a, 1208b and 1208c off; Repeat |
| Low/ Intermediate Charge | Charging | Solid | Blink | Blink | Solid | 1208a on; 1208a and 1208b both on; 1208a, 1208b and 1208c all on; Repeat |
| Intermediate Charge | Charging | Solid | Solid | Blink | Solid | Not applicable |
| Fully Charged | Complete | Solid | Solid | Solid | Solid | Not applicable |
| Bad Battery | Not applicable | Blink | Blink | Blink | Blink | 1208a, 1208b, 1208c, 1212 all on; 1208a, 1208b, 1208c, 1212 all on; Repeat |

Another implementation is described in Table II:

TABLE II

| State of Charge | Charge Status | Fuel Gauge Segment 1208a | Fuel Gauge Segment 1208b | Fuel Gauge Segment 1208c | Battery Icon |
|---|---|---|---|---|---|
| Empty/Low Charge | Charging | Off | Off | Off | Blink |
| Low/ Intermediate Charge | Charging | Solid | Off | Off | Blink |
| Intermediate Charge | Charging | Solid | Solid | Off | Blink |
| Intermediate/ High Charge | Charging | Solid | Solid | Solid | Blink |
| Fully Charged | Complete | Solid | Solid | Solid | Solid |
| Bad Battery | Not applicable | Blink | Blink | Blink | Solid |

In the case of a bad battery, "Bad" or other suitable text may alternatively or additionally be displayed in the textual display portion 1204. Completion of a charge may also be indicated by displaying "Done" or other suitable text in the display portion. As will be appreciated, the display 120 shown in FIG. 12A would operate similarly.

Figure 13:
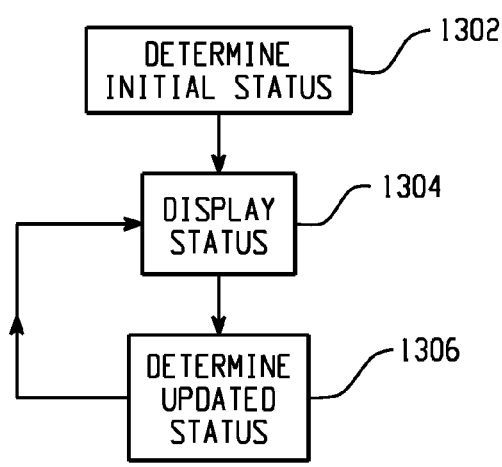
FIG. 13 depicts a battery charger user interface method.

Operation of the user interface 120 will now be described in relation to FIG. 13. The initial battery status is determined at 1302. Where the operator interface is used with a charger 100 configured as described above, the initial battery status would be determined when the user closes the cover 104. The initial status information would typically include one or more of the number, location, sizes, initial charge states, and good/bad status.

The desired status information is displayed at step 1304 in conjunction with the charging of the batteries.

The battery status is updated periodically at step 1306, whereupon the updated status information is displayed at 1304 and the process repeats.

It should also noted that the above described techniques are not limited to use with battery chargers and may also be used in connection with battery powered electrical devices.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A battery charger comprising:
    a first battery charging bay which receives a variable number of batteries for charging;
    a second battery charging bay which receives a variable number of batteries for charging;
    a human readable display which displays a first number of icons and a second number of icons, wherein the first number of icons represents the number of batteries received in the first bay and the second number of icons represents the number of batteries received in the second bay; wherein the first bay receives batteries having different battery sizes and the human readable display displays the size of a battery received in the first bay.

2. The battery charger of claim 1 wherein the icons are battery shaped.

3. The battery charger of claim 1 wherein the display displays the battery size in a textual form.

4. The battery charger of claim 1 wherein the first and second number of icons are displayed concurrently.

5. The battery charger of claim 1 wherein the battery charger further includes:
    positive and negative battery contacts which make electrical contact with positive and negative terminals of a battery received in the first bay;
    a cover movable to an open position for inserting a battery in the first bay and a closed position, wherein moving the cover varies a distance between the battery contacts, and wherein the display is carried by the cover for movement therewith.

6. The battery charger of claim 1 wherein the display displays a first fuel gauge which represents, in graphical form, a charge state of a battery received in the first bay and a second fuel gauge which represents, in graphical form, a charge state of a battery received in the second bay.

7. The battery charger of claim 6 wherein the first fuel gauge blinks to indicate that the battery received in the first bay is being charged and is displayed continuously to indicate that the battery received in the first bay is fully charged.

8. The battery charger of claim 6 wherein a dimension of the first fuel gauge is a function of the charge state of the battery received in the first bay.

9. The battery charger of claim 6 wherein the charge state is an estimate of a remaining charge time.

10. The battery charger of claim 1 wherein the first and second bays receive batteries selected from a group including AAA, AA, C and D-size batteries.

11. The battery charger of claim 1 further including
    a third battery charging bay which selectively receives a variable number batteries for charging;
    a fourth battery charging bay which selectively receives a variable number batteries for charging;
wherein the display displays a third number of icons and a fourth number of icons, wherein the third number of icons represents the number of batteries received in the third bay and the fourth number of icons represents the number of batteries received in the fourth bay.

12. A battery charger including:
    a first battery receiving region which receives at least one generally cylindrical battery for charging;
    a second battery receiving region which receives at least a one generally cylindrical battery for charging;
    a human readable display including a first display region which displays information indicative of a battery received in the first battery receiving region, wherein the first display region includes a first graphical display portion and a first textual display portion;
    wherein the first graphical display portion displays a battery shaped icon to indicate that a battery is present in the battery receiving region for charging and the first textual portion displays the size of the battery;
    a second display region which displays information indicative of a battery received in the second battery receiving region, wherein the second display region includes a second graphical display portion and a second textual display portion.

13. The battery charger of claim 12 wherein the first display portion displays information indicative of a state of charge and a size of a battery present in the first battery receiving region and the second display portion displays information indicative of a state of charge and a size of a battery present in the second battery receiving region.

14. The battery charger of claim 12 wherein the human readable display is an LCD display.

* * * * *